(12) United States Patent
Crutchfield et al.

(10) Patent No.: US 7,139,344 B2
(45) Date of Patent: Nov. 21, 2006

(54) METHOD AND APPARATUS FOR EFFECTING SYNCHRONOUS PULSE GENERATION FOR USE IN VARIABLE SPEED SERIAL COMMUNICATIONS

(75) Inventors: David Allen Crutchfield, Lexington, KY (US); Timothy John Rademacher, Lexington, KY (US); Galen Arthur Rasche, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 866 days.

(21) Appl. No.: 09/896,975

(22) Filed: Jun. 29, 2001

(65) Prior Publication Data

US 2002/0196884 A1 Dec. 26, 2002

Related U.S. Application Data

(63) Continuation-in-part of application No. 09/859,782, filed on May 16, 2001.

(51) Int. Cl.
 *H04L 7/00* (2006.01)
(52) U.S. Cl. ........................ 375/354; 375/316; 375/357; 370/503
(58) Field of Classification Search ............... 375/376, 375/371, 354, 357, 368, 119, 362, 333, 361, 375/360, 377, 359, 293, 288, 257, 289, 316; 327/156, 160, 141, 503; 370/512, 514, 503, 370/242; 328/63, 61, 155; 341/100, 101; 307/269; 714/798, 810, 815, 820, 712, 719; 709/246; 178/69 R; 324/509, 521
See application file for complete search history.

(56) References Cited

U.S. PATENT DOCUMENTS 3,609,662 A * 9/1971 Grimm ..................... 375/359
3,938,082 A * 2/1976 Schowe, Jr. ................ 714/798
4,280,099 A * 7/1981 Rattlingourd ............... 327/160
4,280,221 A * 7/1981 Chun et al. ................. 375/288
5,072,407 A * 12/1991 Gutz et al. .................. 709/246
5,444,743 A * 8/1995 Scarpa ....................... 375/368

(Continued)

OTHER PUBLICATIONS

IEEE Standard for a high Performance Serial Bus-Amendment 1☐☐IEEE Std 1394a-2000, vol., Iss., 2000☐☐pp. 125-129, 135,171-172☐☐.*

(Continued)

*Primary Examiner*—Temesghen Ghebretinsae
(74) *Attorney, Agent, or Firm*—Taylor & Aunt

(57) ABSTRACT

A method for effecting synchronous pulse generation for use in variable speed serial communications is provided. The method includes the steps of obtaining a communication link speed; generating a difference signal representing a signal level difference between at least two data stream signals; providing a clock signal; providing a counter; defining a sample count value of the counter using the communication link speed; incrementing the counter in relation to the clock signal; and determining whether a current count value of the counter corresponds to the sample count value. If the current count value corresponds to the sample count value, then the method performs a step of generating a synchronous pulse. If the current count value does not correspond to the sample count value, then the method performs a step of determining whether a signal level of said difference signal has changed, and if the signal level of the difference signal has changed then performing a step of ignoring further changes in the signal level of the difference signal until the current count value of the counter corresponds to the sample count value at which time the step of generating the synchronous pulse is repeated.

22 Claims, 11 Drawing Sheets

U.S. PATENT DOCUMENTS

| | | | | |
|---|---|---|---|---|
| 5,594,763 | A | * | 1/1997 | Nimishakavi ............... 375/376 |
| 5,689,533 | A | * | 11/1997 | Brauns et al. ............... 375/360 |
| 5,696,777 | A | * | 12/1997 | Hofsaess .................... 714/820 |
| 5,809,091 | A | * | 9/1998 | Barrow ....................... 375/354 |
| 5,845,152 | A | | 12/1998 | Anderson et al. ........... 395/872 |
| 5,910,742 | A | | 6/1999 | Synder et al. ............... 327/165 |
| 5,923,193 | A | | 7/1999 | Bloch et al. ................. 327/141 |
| 5,958,020 | A | | 9/1999 | Evoy et al. ..................... 710/3 |
| 5,958,027 | A | | 9/1999 | Gulick et al. ................. 710/52 |
| 5,982,837 | A | * | 11/1999 | Earnest ....................... 375/377 |
| 6,169,501 | B1 | * | 1/2001 | Ryan ........................... 341/101 |
| 6,226,345 | B1 | * | 5/2001 | Skergan ........................ 377/37 |
| 6,247,082 | B1 | | 6/2001 | Lo et al. ...................... 710/105 |
| 6,247,083 | B1 | | 6/2001 | Hake et al. ................. 710/107 |
| 6,359,946 | B1 | * | 3/2002 | Ryan ........................... 375/371 |
| 6,700,943 | B1 | * | 3/2004 | Miller ......................... 375/354 |

OTHER PUBLICATIONS

IEEE-1394: a standard for the next millenium☐☐Santamaria, R.;☐☐Digital Avionics Systems Conference, 1999. Proceedings. 18th , vol. 1/17 pp. vol. 1 , Oct. 24-29, 1999 ☐☐pp. 1.C.2-1-1.C.2-7 vol. 1☐☐.*

Draft Standard for a High Performance Serial Bus (Supplement); P1394b Draft 1 .1 1 ; Mar. 27, 2001; IEEE; pp. 21, 44-46; 99-100; 103-107;141;145-151; 160-161;243;258 265-267.*

IEEE 100 : the authoritative dictionary of IEEE standards terms. Author: IEEE; Imprint: New York : IEEE Press, 2000 pp. 302 and 304.*

Draft Standard for a High Performance Serial Bus (Supplement); P1394b Draft 1.11; Mar. 27, 2001; IEEE; pp. 21, 33-53; 94-110; 139-168; 243-280; 381-382.

USB VS Fire Wire; Katherine M. Henry; http://e-redlands.uor.edu/m . . . /USB%20and%20Fire%20Wire3.ht; 2001; pp. 1-3.

3 V 1 Port IEEE 1394-1995 Cable Transceiver/Amplifier TSB11LV01; Texas Instruments; 1997; pp. 1-20.

Standards IEEE 1394: Changing the Way We Do Multimedia Communications; Peiya Lu, Siemens Corporate Research; David Thompson, Bell Labs; 2000; http://computer.org/multimedia/articles/firewire.htm; pp. 1-16.

* cited by examiner

METHOD AND APPARATUS FOR EFFECTING SYNCHRONOUS PULSE GENERATION FOR USE IN VARIABLE SPEED SERIAL COMMUNICATIONS

This is a continuation-in-part of U.S. patent application Ser. No. 09/859,782, entitled "METHOD AND APPARATUS FOR EFFECTING SYNCHRONOUS PULSE GENERATION FOR USE IN SERIAL COMMUNICATIONS", filed May 16, 2001.

BACKGROUND OF THE INVENTION

1. Field of the Invention

The present invention relates to serial communications, and, more particularly, to a method and apparatus for effecting synchronous pulse generation for use in variable speed serial communications.

2. Description of the Related Art

A Universal Serial Bus (hereinafter referred to as "USB") permits a variety of peripheral devices, such as a printer or scanner, to be connected to a generic port in a host computer. During communication between a host computer and peripheral device via a USB, data is transmitted over the bus, but the USB does not transmit a clock for synchronization. Therefore, it is necessary for a USB receiver to have some mechanism to synchronize itself with the incoming data. The USB Specification (version 1.1) describes methods of encoding transmitted data for keeping a receiving device synchronized with the incoming data. Each packet transmitted on USB begins with a synchronization field to allow the receiver to synchronize with the transmitted data. The receiver is kept in synchronization with the transmitter by the non return to zero invert (hereinafter referred to as "NRZI") encoding and by bitstuffing if the NRZI encoding does not signal a transition after 6 bits.

Current USB systems utilize multiple clocks, one of which is a 12 MHz clock that is synchronized to the data on the USB. For example, U.S. Pat. No. 5,910,742 issued to Snyder, et al. (hereinafter referred to as "Snyder") discloses a circuit and method for synchronizing a data signal to one of a plurality of clocks. Snyder discloses using two pulses generated by the transmission of data to select one of many clocks to use for recovering the transmitted data. In Snyder, a clock generator is configured to generate a plurality of clocks and/or a logic circuit is configured to select the clock signal having the closest timing in relationship with the data signal.

Typically, USB systems include a USB controller for synchronizing the timing relationships by relying on feedback to synchronize incoming data. A USB controller in a typical system uses a digital phase-locked loop (hereinafter referred to as "DPLL") circuit that runs on a 48 MHz clock. The USB data signals, commonly referred to as D+ and D−, are inputs into the DPLL and the DPLL outputs a 12 MHz clock signal synchronized to the USB data. The USB controller uses the DPLL clock signal to extract the bit values of the USB data. In many systems, the clock synchronized with the USB is unsuitable for other logic that interfaces with the USB because the clock rate is slower and the clock frequency or period varies. For example, the 48 MHz clock signal may be divided to generate a 24 MHz clock signal for a processor or other logic. Thus, a separate clock is used for the processor and the other logic in those systems. Multiple clocks require additional logic for synchronization between the clock domains and multiple clocks complicate the testing of the system logic.

One method and apparatus for synchronizing circuitry between multiple clock timing domains, such as a USB, is disclosed in U.S. Pat. No. 5,923,193 issued to Bloch, et al. (hereinafter referred to as "Bloch"). In FIG. 2 of Bloch, a timing diagram illustrates a source clock, a fixed clock and a latch signal. Bloch discloses that the source clock signal has a 48 MHz frequency and that the clock divider circuit divides the source clock signal frequency to produce a 12 MHz clock signal. It is important to note that Bloch discloses passing the arriving data signal through a DPLL, and thus, Bloch discloses at least two clock domains, the system clock and the DPLL clock. Once created, these two clock domains are delayed in such a way that they are staggered slightly aiding in decoding the incoming data. A latching pulse, created using the internal 48 MHz clock, pulses every four edges of the 48 MHz clock. These signals along with a latching scheme are used to decode the incoming data.

Attempts have been made to optimize the flow of isochronous data and clock rate information over a USB, such as that disclosed in U.S. Pat. No. 5,958,027 issued to Gulick (hereinafter referred to as "Gulick"). In Gulick, the USB conveys a control signal to a data producer to increase or decrease the clock rate of the data producer based upon the level of data within the buffer of the USB. Thus, in Gulick the clock rate of the data producer or data transmitter is changed.

The IEEE 1394-1995, IEEE-1394a and IEEE-1394b standards define buses which allow high speed transfers of data to and from a variety of peripheral devices such as a printer, scanner, digital video equipment and high-performance mass storage.

The 1394a bus uses two twisted pairs, TpA and TpB, to transfer data between devices. Signals on the 1394a bus twisted pairs are also referred to as Data and Strobe. During communication between, for example, a host computer and a peripheral device via a 1394a bus, data is transmitted without a clock signal for synchronization. Therefore, it is necessary for a device receiving data via a 1394a bus to have a mechanism to synchronize the data for use therein. Whereas the Strobe signal only transitions when the generating clock transitions and the Data has not changed, the generating clock of Data and Strobe can be recovered by directing the Data and Strobe signals through an exclusive-OR gate. This recovered clock can then be used to sample the incoming Data. An S-notation is used relative to the 1394a bus to indicate the approximate bus speed in Mbits per second. For example, S400 is 393.216 Mb/s or nearly 400 Mb/s. The IEEE 1394-1995 and 1394a standards allow for data rates up to S400. To allow faster data rates, changes had to be made to the method of sending and recovering data to and from each device. These changes are made in the 1394b revision, which allows for data rates of up to S3200.

To enable the IEEE-1394b bus to have higher aggregated throughput, dual simplex communications are used, hence each TpA and TpB pair transmits continuously in one direction, thus allowing a device to receive data while simultaneously transmitting data. The IEEE-1394b bus, while allowing for faster data rates, eliminates the Strobe signal and hence the clock recovery outlined above for the 1394a bus. To prepare parallel data to be transmitted over the IEEE-1394b bus, the data is first scrambled to reduce radiated emissions. The scrambled data is then encoded using an 8B/10B encoding technique which creates 10 bits for each 8 bit word so as to ensure DC balance and allow clock recovery. Clock recovery is possible since the 8B/10B encoding guarantees that a transition will occur at least once every 5 bits. The transmitter device then serializes the scrambled, encoded data for transmission on the IEEE-1394b bus.

At a receiving device the serial data is received and by use of a phase-locked loop circuit, which monitors transitions in the data to stay locked to the bus frequency, the data is recovered by sampling the serial data. The data is then processed into 10 bit parallel data which is decoded using an 8B/10B decoder into 8 bit words which are then unscrambled into the recovered parallel data which was sent from the sending device.

What is needed in the art is a method and apparatus for effecting synchronous pulse generation for variable speed serial communications using a simplified hardware configuration.

SUMMARY OF THE INVENTION

The present invention provides method and apparatus for effecting synchronous pulse generation for use in variable speed serial communications.

The invention comprises, in one form thereof, a method including the steps of obtaining a communication link speed; generating a difference signal representing a signal level difference between at least two data stream signals; providing a clock signal; providing a counter; defining a sample count value of the counter using the communication link speed; incrementing the counter in relation to the clock signal; and determining whether a current count value of the counter corresponds to the sample count value. If the current count value corresponds to the sample count value, then the method performs a step of generating a synchronous pulse. If the current count value does not correspond to the sample count value, then the method performs a step of determining whether a signal level of said difference signal has changed, and if the signal level of the difference signal has changed then performing a step of ignoring further changes in the signal level of the difference signal until the current count value of the counter corresponds to the sample count value at which time the step of generating the synchronous pulse is repeated.

In another form, the invention provides a method of extracting data from a difference signal representing a signal level difference between at least two data stream signals. The method includes the steps of providing a clock signal; determining a communication link speed; providing a counter; defining a sample count value of the counter utilizing the communication link speed; incrementing the counter in relation to the clock signal; and determining whether a current count value of the counter corresponds to the sample count value. If the current count value corresponds to the sample count value then the method performs a step of sampling the difference signal to extract data from the difference signal. If the current count value does not correspond to the sample count value, then the method performs a step of determining whether a signal level of the difference signal has changed, and if the signal level of the difference signal has changed then performing the step of ignoring further changes in the signal level of the difference signal until the current count value of the counter corresponds to the sample count value at which time the step of sampling the difference signal to extract data from the difference signal is repeated.

In still another form, the invention provides a variable speed communications device including a receiver having a first input, a second input and a first output, the first input being adapted for receiving a first data signal stream and the second input being adapted for receiving a second data signal stream. The receiver processes the first data signal stream and the second data signal stream to generate a difference signal representing a difference between the first data signal stream and the second data signal stream. A synchronous pulse generator is provided having a first difference signal input, a clock signal input, a speed input and a synchronous pulse output, the difference signal input being coupled to the first output for receiving the difference signal, the speed input being adapted to receive a variable representative of a communication link speed and the clock signal input being adapted for receiving a clock signal. The synchronous pulse generator processes the clock signal, the communication link speed and the difference signal to generate a synchronous pulse used for extracting data from the difference signal.

In still another form, the invention provides an IEEE 1394b communications device, including a receiver having a first input, a second input and a first output, the first input being adapted for receiving a first data signal stream and the second input being adapted for receiving a second data signal stream. The receiver processes the first data signal stream and the second data signal stream to generate a difference signal representing a difference between the first data signal stream and the second data signal stream. A synchronous pulse generator is provided having a first clock input, a first difference signal input, a speed input and a synchronous pulse output, the first clock input being adapted for receiving a clock signal, the speed input being adapted to receive a communication speed and the first difference signal input being coupled to the output for receiving the difference signal. The synchronous pulse generator processes the clock signal and the difference signal to generate a synchronous pulse used for extracting data from the difference signal. A serial/parallel translator is provided having a second clock input, a second difference signal input, a synchronous pulse input and an encoded data output, the second clock input being coupled to the first clock input for receiving the clock signal, the second difference signal input being connected to the first difference signal input for receiving the difference signal and the synchronous pulse input being connected to the synchronous pulse output for receiving the synchronous pulse. The serial/parallel translator processes the clock signal, the difference signal and the synchronous pulse to generate encoded data for output on the encoded data output. An 8B/10B decoder is provided having a third clock input, an encoded data input and a scrambled data output, the third clock input being coupled to the first clock input for receiving the clock signal, the encoded data input being coupled to the encoded data output for receiving the encoded data. The 8B/10B decoder processes the clock signal and the encoded data to generate scrambled data for output on the scrambled data output. A descrambler is provided having a fourth clock input, a scrambled data input and a parallel data output, the fourth clock input being coupled to the first clock input for receiving the clock signal, the scrambled data input being coupled to the scrambled data output for receiving the scrambled data. The descrambler processes the clock signal and the scrambled data to generate parallel data for output on the parallel data output.

In still another form, the invention provides a method for synchronizing a receiver to data including the steps of detecting a data speed; initializing a counter to count clock cycles; detecting a current count value; defining a sampling count value based on said data speed; detecting a change in the data; incrementing the count value if no change in the data is detected; and generating a pulse when said count reaches said sampling count value.

An advantage of the invention is that variable speed serial communications is facilitated using a simplified hardware configuration.

Another advantage of the present invention is that the phase lock loop circuit of a typical serial communications system can be eliminated.

Still another advantage of the present invention is that the operation of a serial communications standard, that does not transmit a synchronization signal, is facilitated.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein are not to be construed as limiting the scope of the invention in any manner.

DETAILED DESCRIPTION OF THE INVENTION

Figure 1:
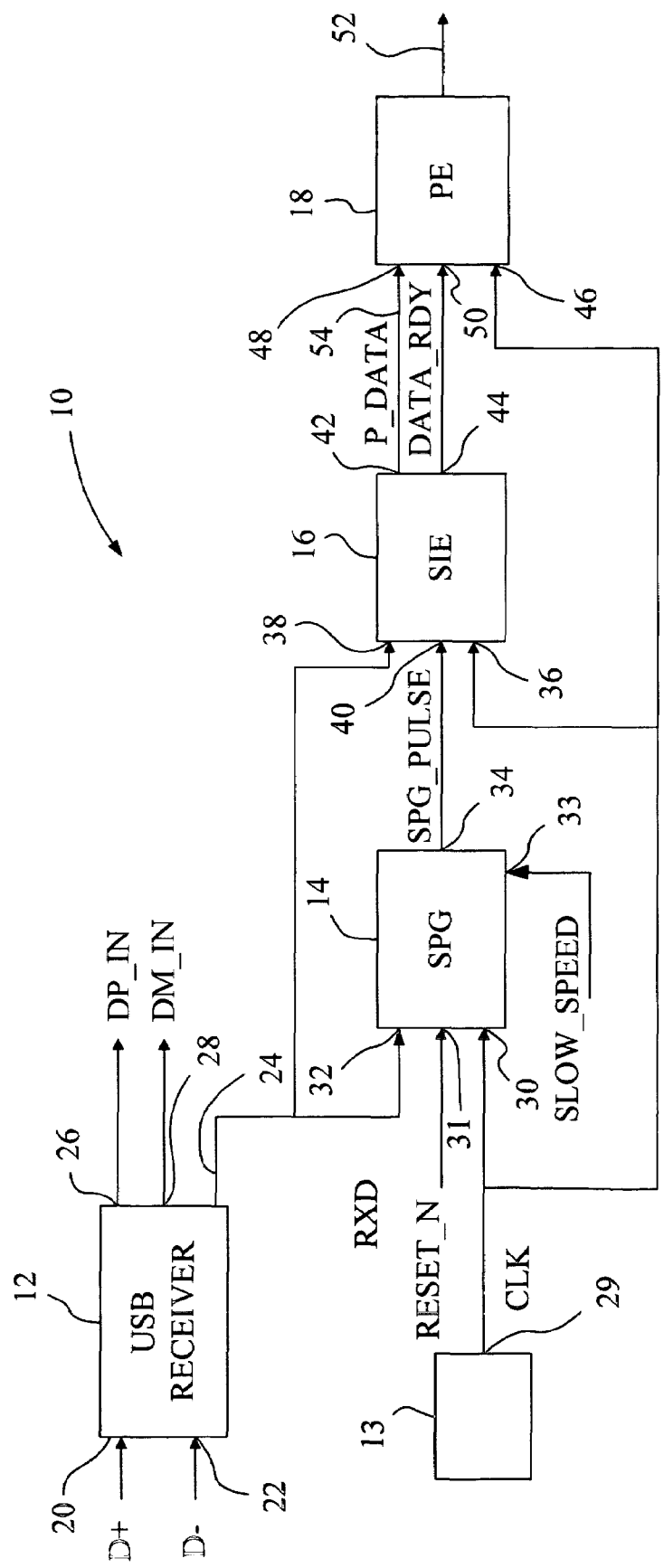
FIG. 1 is a general block diagram of a USB communication device embodying the present invention.

Referring now to the drawings and particularly to FIG. 1, there is shown a general block diagram of a USB communications device 10 embodying the present invention. For both sending and receiving data, a synchronization pulse is generated to enable the USB sending and receiving logic. However, for sending USB data, synchronization of the data is not necessary because the device or host that is receiving the data is responsible for synchronizing its logic to the transmitted data. Therefore, for sending data, a pulse is generated every 83.3 ns for a 12 MHz operation of the sending logic. Those skilled in the art will recognize that the transmitter portion of USB communications device 10 pertaining to the generation and transmission of data packets using a USB protocol can be implemented using apparatus and methods well known in the art. Thus, for ease of understanding the present invention, the transmitter portion of USB communications device 10 pertaining to the generation and transmission of data packets using a USB protocol is omitted from further discussion herein.

The present invention synchronizes USB communications device 10 with incoming USB data. USB communications device 10 is preferably implemented in the form of an application specific integrated circuit (ASIC), and includes processing circuitry for processing signals in a predetermined fashion. As shown in the block diagram of FIG. 1, USB communications device 10 includes a USB receiver 12, a clock source 13, a synchronous pulse generator (SPG) 14, a serial interface engine (SIE) 16 and a protocol engine (PE) 18.

USB receiver 12 has a first input 20, a second input 22, a difference signal output 24, a first buffered output 26 and a second buffered output 28. First input 20 is adapted for receiving a first data signal stream D+ and second input 22 is adapted for receiving a second data stream D−. First data signal stream D+ and second data signal stream D− are physically located on two data signal lines of the USB. USB receiver 12 executes processing steps for processing first data signal stream D+ and second data signal stream D− to generate a difference signal RXD representing a voltage difference between first data signal stream D+ and second data signal stream D−. First buffered output 26 and second buffered output 28 provide buffered D+ and D− data signal streams, represented as buffered output signals DP_IN and DM_IN, respectively.

Clock source 13 is a free running oscillator having a clock output 29. Clock source 13 generates a clock signal CLK that is provided to clock output 29. Preferably, clock signal CLK has a frequency of 48 MHz, although it is to be understood that the present invention will work with any clock frequency that is a multiple of 4 or more times 12 MHz.

Synchronous pulse generator 14 has a clock input 30, a reset input 31, a difference signal input 32, a speed input 33 and a synchronous pulse output 34. Clock input 30 is coupled to clock output 29 of clock source 13 and is adapted for receiving clock signal CLK. Reset input 31 is adapted to receive a reset input signal RESET_N. Difference signal input 32 is coupled to difference signal output 24 of USB receiver 12 for receiving difference signal RXD. Speed input 33 is adapted to receive speed input signal SLOW_SPEED. The signal level of speed input signal SLOW_SPEED indicates whether synchronous pulse generator 14 is to operate at a slow speed or at full speed. Synchronous pulse generator 14 executes processing steps to process clock signal CLK and difference signal RXD to generate a synchronous pulse SPG_PULSE that in turn is provided to synchronous pulse output 34. Synchronous pulse SPG_PULSE is used to signify a time for sampling difference signal RXD to extract data from difference signal RXD.

Serial interface engine 16 has clock input 36, a difference signal input 38, a synchronous pulse input 40, a parallel output 42 and a data ready output 44. Clock input 36 is coupled to clock output 29 of clock source 13, and in parallel with clock input 30 of synchronous pulse generator 14, for receiving clock signal CLK. Difference signal input 38 is coupled to difference signal output 24 of USB receiver 12, and in parallel with difference signal input 32 of synchronous pulse generator 14, for receiving difference signal RXD. Synchronous pulse input 40 is coupled to synchronous pulse output 34 of synchronous pulse generator 14 for receiving synchronous pulse SPG PULSE. Serial interface engine 16 executes processing steps to process clock signal CLK, difference signal RXD and synchronous pulse SPG_PULSE to generate parallel data P_DATA for output on parallel output 42. When P_DATA is present at parallel output 42, serial interface engine 16 further generates a data ready signal DATA_RDY that is provided to data ready output 44.

Protocol engine 18 has a clock input 46, a parallel input 48, a data ready input 50, and an output 52. Clock input 46 is coupled to clock output 29 of clock source 13, which in turn is coupled in parallel with clock inputs 30 and 36. Parallel input 48 is coupled to parallel output 42 of serial interface engine 16 via a parallel bus 54 for receiving parallel data P_DATA. Data ready input 50 is coupled to data ready output 44 of serial interface engine 16 for receiving data ready signal DATA_RDY. Protocol engine 18 executes processing steps to process clock signal CLK, parallel data P_DATA and data ready signal DATA_RDY to generate processed data for output on output 52. Output 52 is coupled to a parallel bus (not shown) in a system, such as a printer or host computer, with which the USB communications device 10 is associated.

During operation of USB communications device 10, the physical USB signals, including data signal stream D+ and data signal stream D−, initially enter USB receiver 12. USB receiver 12 buffers data signal streams D+ and D− and generates difference signal RXD. Difference signal RXD is based on the condition of D+ being greater than D−. Difference signal RXD is passed to both synchronous pulse generator 14 and serial interface engine 16. The synchronization pulse SPG_PULSE generated by synchronous pulse generator 14 is used to synchronize the logic in serial interface engine 16 for extraction of data from difference signal RXD, and for the conversion of the serial difference signal RXD signal into a parallel format to generate parallel data P_DATA. When serial interface engine 16 has converted eight bits of data to generate P_DATA, the P_DATA is provided to parallel output 42 and in turn to parallel bus 54. Once P_DATA is present on parallel bus 54, the state of data ready signal DATA_RDY is changed to inform protocol engine 18 of the availability of P_DATA for reading by protocol engine 18. Protocol engine 18 is responsible for interpreting the data for USB packet information.

In order to read received USB data it is necessary to synchronize synchronization pulse SPG_PULSE with the rate at which the data is changing. The maximum USB data jitter is 20.0 ns from transition to transition. Therefore, the data must be captured near the center of the bit period. This is accomplished by aligning synchronization pulse SPG_PULSE a certain number of clock periods after a change in the difference signal RXD. Every time a synchronization pulse SPG_PULSE is generated, the serial interface engine 16 samples difference signal RXD to determine what kind of a bit is being transferred. If difference signal RXD has changed, then a logic 0 is being transmitted. If difference signal RXD has not changed, then a logic 1 is being sent. For example, if the bits 11110000 were transmitted, difference signal RXD would change in value every 83.3 ns for each logic 0 and would stay the same for the ones. Thus, in order to know how many ones were being sent, synchronization pulse SPG_PULSE must be aligned correctly with difference signal RXD. USB uses bitstuffing to guarantee a transition on difference signal RXD at least every 7 bit periods to keep the USB receiver of the receiving device synchronized with the USB transmitter of the transmitting device.

Figure 2:
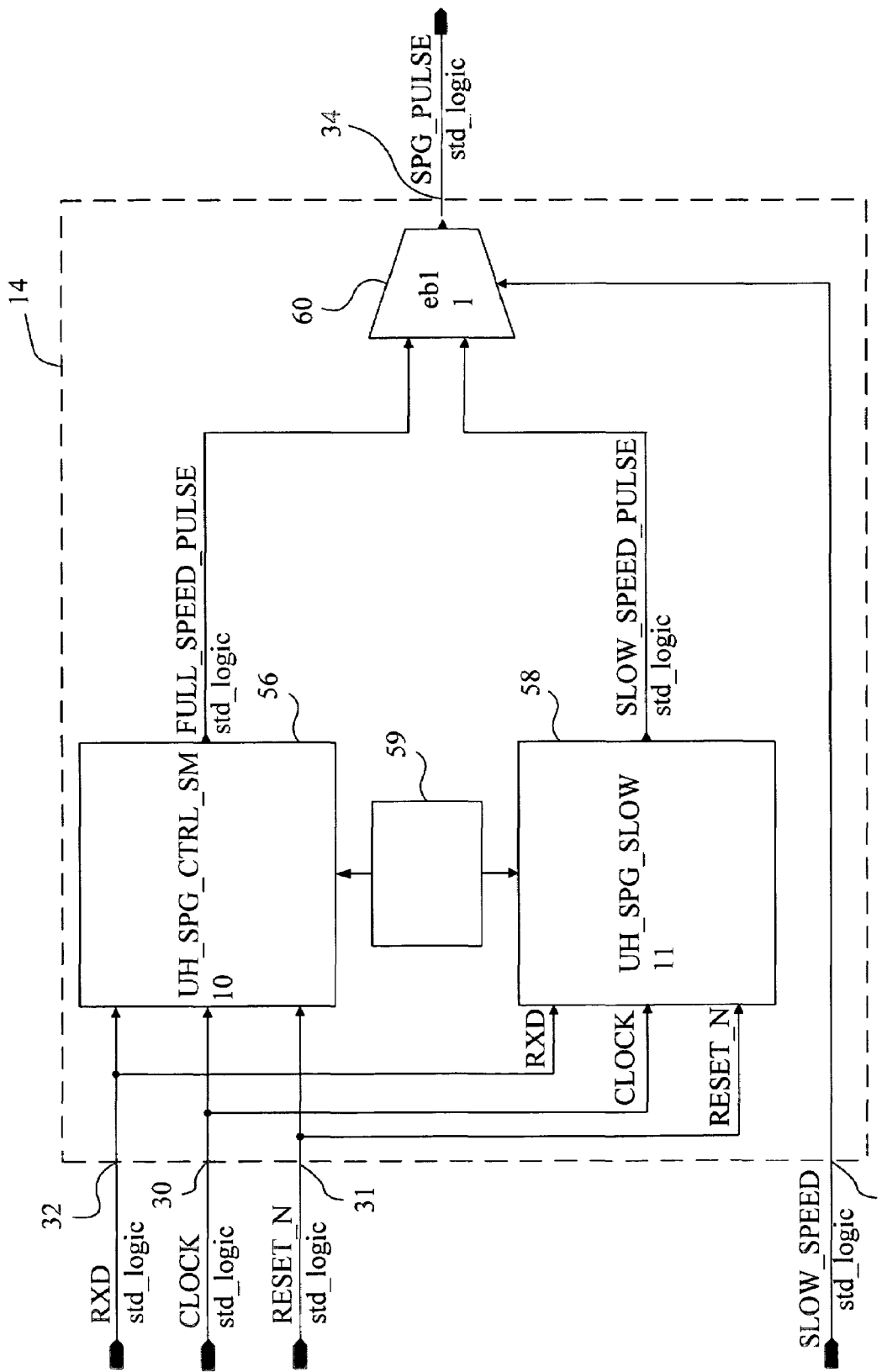
FIG. 2 is a block diagram of the synchronous pulse generator of FIG. 1.

FIG. 2 is a detailed block diagram of synchronous pulse generator 14. As previously described, synchronous pulse generator 14 includes clock input 30, reset input 31, difference signal input 32, speed input 33 and synchronous pulse output 34. Synchronous pulse generator 14 includes a full speed controller 56, a slow speed controller 58, a counter 59 and a multiplexer 60. Counter 59, as shown, is connected to provide count values to each of full speed controller 56 and slow speed controller 58, and when enabled is incremented at each cycle of clock signal CLK. Counter 59 may be implemented as a physical counter device, or in software or firmware as a state machine. Also, it is contemplated that counter 59 may be replaced by two independent counters, each being dedicated to a respective one of full speed controller 56 and slow speed controller 58.

Full speed controller 56 provides a full-speed pulse output signal FULL_SPEED_PULSE. Slow speed controller 58 provides a slow speed pulse output signal SLOW_SPEED_PULSE. Thus, full speed controller 56 and slow speed controller 58 provide for full-speed and slow-speed USB communications, respectively. Multiplexer 60 selects between the signals FULL SPEED_PULSE and SLOW_SPEED_PULSE for output as synchronous pulse SPG_PULSE, based on the signal level present at speed input 33. For example, if speed input signal SLOW_SPEED is at a logic low level, then the full speed output signal FULL_SPEED_PULSE of full speed controller 56 is selected to be the synchronous pulse SPG_PULSE present at synchronous pulse output 34. Likewise, if speed input signal SLOW_SPEED is at a logic high level, then the slow speed output signal SLOW_SPEED_PULSE of slow speed controller 58 is selected to be the synchronous pulse SPG_PULSE present at synchronous pulse output 34. The details of the operation of full speed controller 56 and slow speed controller 58 are presented below following a discussion of the general operation of synchronous pulse generator 14.

Figure 3:
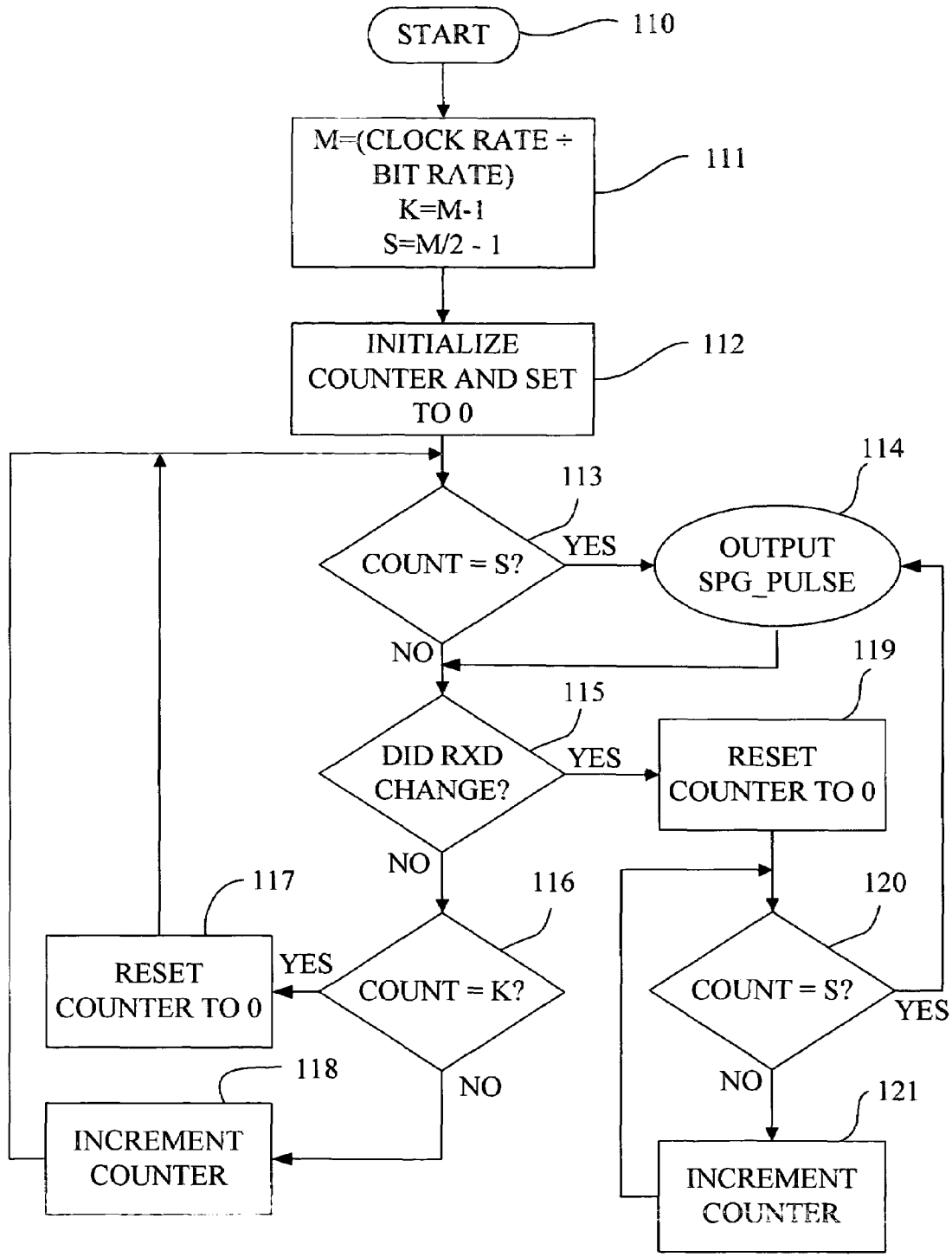
FIG. 3 is a flow diagram depicting the operation of the synchronous pulse generator of FIG. 2.

FIG. 3 is a flow diagram depicting the operation for synchronous pulse generator 14 shown in FIGS. 1 and 2. The flow diagram of FIG. 3 describes both processes that occur synchronous to clock signal CLK and some of which that occur in parallel. Therefore, it is necessary to first describe the meaning of the symbols in the diagram. An oval is used for the start state at step 110. Note that there is no stop state in the diagram because synchronous pulse generator 14 runs until power is removed or is reset. Rectangles are used for actions that occur synchronous with the clock. Rounded rectangles are used for actions that occur asynchronously. An ellipse is used for a parallel process that is begun when the box is reached. Finally, diamonds are used for flow decision points.

Operation begins at step 110 and proceeds to step 111. At step 111, the values for the variables M, K and S are calculated. The variable M is defined as a clock multiple, and is calculated by dividing the clock rate by the bit rate. Thus, the clock rate is M times the bit rate. The bit rate of slow-speed USB is 1.5 MHz and the bit rate for full-speed USB is 12 MHz. Using a clock signal CLK having a frequency of 48 MHz, the values of M are therefore 32 and 4 for slow and full speed, respectively. Then, K is the maximum value of zero-based counter 59 used in synchronous pulse generator 14 (see FIG. 2). S is the value of counter 59 at which time the difference signal RXD should be sampled. Round-down integer division should be used to calculate the value for S. For example, if M is 5 then M/2=2 and S=1. The value of M is not used elsewhere in the flow diagram; it is only used to calculate K and S. In the actual implementation of this diagram, the calculations for M, K and S may not be an actual step in the device operations, but instead may be determined a priori and their values used to determine the configuration of synchronous pulse generator 14.

Step 112 represents a reset state, in which counter 59 is initialized and its count set to zero. After the reset ends, operation continues to step 113 where the count of counter 59 is compared to the value determined for S. If the count is equal to S, then at step 114 a sampling pulse, i.e., synchronous pulse SPG_PULSE, is output at synchronous pulse output 34 and is used to signify that it is time for sampling difference signal RXD to extract data from difference signal RXD. The duration of each pulse of synchronous pulse SPG_PULSE is one clock cycle. Also, synchronous pulse SPG_PULSE may be used as an enable signal to enable the logic used in extracting the data from difference signal RXD.

If at step 113 the count of counter 59 is not equal to the value determined for S, then the process continues to step 115. At step 115, difference signal RXD is checked for changes. This check is performed by comparing a previously stored value for difference signal RXD (hereinafter, RXD_TEMP) stored in a register in USB receiver 12 with the current value of difference signal RXD. The current difference signal RXD is compared to RXD_TEMP each clock cycle, and thereafter the current difference signal RXD is saved as the new RXD_TEMP. If there was no change of the state of difference signal RXD, then at step 116 the count of counter 59 is compared to the terminal count K. At step 116, if the count is at its terminal count K, then at step 117 counter 59 is reset and the process proceeds back to step 113. However, if at step 116, if the count is not at its terminal count K, then at step 118 counter 59 is incremented, and the process proceeds back to step 113. The count of counter 59 is changed, either by being reset at step 117 or incremented at step 118, on the next rising edge of clock signal CLK.

If, at step 115, it was determined that difference signal RXD had changed, then the count of counter 59 is reset on the next rising edge of clock signal CLK and operation continues in a mode (see steps 119, 120 and 121) in which changes in difference signal RXD are ignored until the count of counter 59 is equal to S, at which time the next sampling pulse (synchronous pulse SPG_PULSE) is outputted to synchronous pulse output 34 and is used in sampling difference signal RXD to extract data from difference signal RXD. At step 119, counter 59 is reset to a count of zero to synchronize synchronous pulse SPG_PULSE with difference signal RXD. At step 120, the count of counter 59 is compared to the value of S. If the count of counter 59 is equal to S, then the process proceeds back to step 114 wherein a next synchronous pulse SPG_PULSE is outputted to synchronous pulse output 34 and is used in sampling difference signal RXD to extract data from difference signal RXD. Thereafter, the process then continues to step 115, as described above. However, if at step 120 the count of counter 59 is not equal to the value of S, then at step 121 the count of counter 59 is incremented on the rising edge of clock signal CLK and the process flow returns to step 120 to again determine whether the count of counter 59 is equal to the value of S.

The flow diagram depicted in FIG. 3 is a generic representation of the invention. Those skilled in the art will recognize that various aspects of the flow diagram could be changed while remaining within the scope of the invention. For example, a down counter could be used in place of the up counter or the counter could start with a count other than zero. Also, state changes could occur on the falling edge or on both edges of the clock signal CLK. Furthermore, it is contemplated that a state machine may be used that does not implement an explicit counter.

One possible change that would affect the behavior of synchronous pulse generator 14 is varying the number of clock cycles during which the changes on difference signal RXD are ignored (see steps 119, 120 and 121). In the flow diagram of FIG. 3 and the preferred implementation of synchronous pulse generator 14, changes are ignored from the time the count of counter 59 is reset in response to a change in difference signal RXD until the synchronous pulse SPG_PULSE is output. This is convenient because the count of counter 59 is already being checked for value S. However, it is contemplated that other values may be acceptable. Furthermore, it is noted that if M is a power of two then an ordinary binary counter will roll-over to 0 from a count of K. In that case, steps 116 and 117 depicted in FIG. 3 can be eliminated. Thus, preferred embodiments of the invention that use an explicit counter are implemented using a binary counter using M values of $2^2$ and $2^5$.

The process described above in relation to the flow diagram of FIG. 3 is incorporated into both full speed controller 56 and slow speed controller 58 to support both full-speed and slow-speed USB traffic. Both implementations are discussed below.

Figure 4:
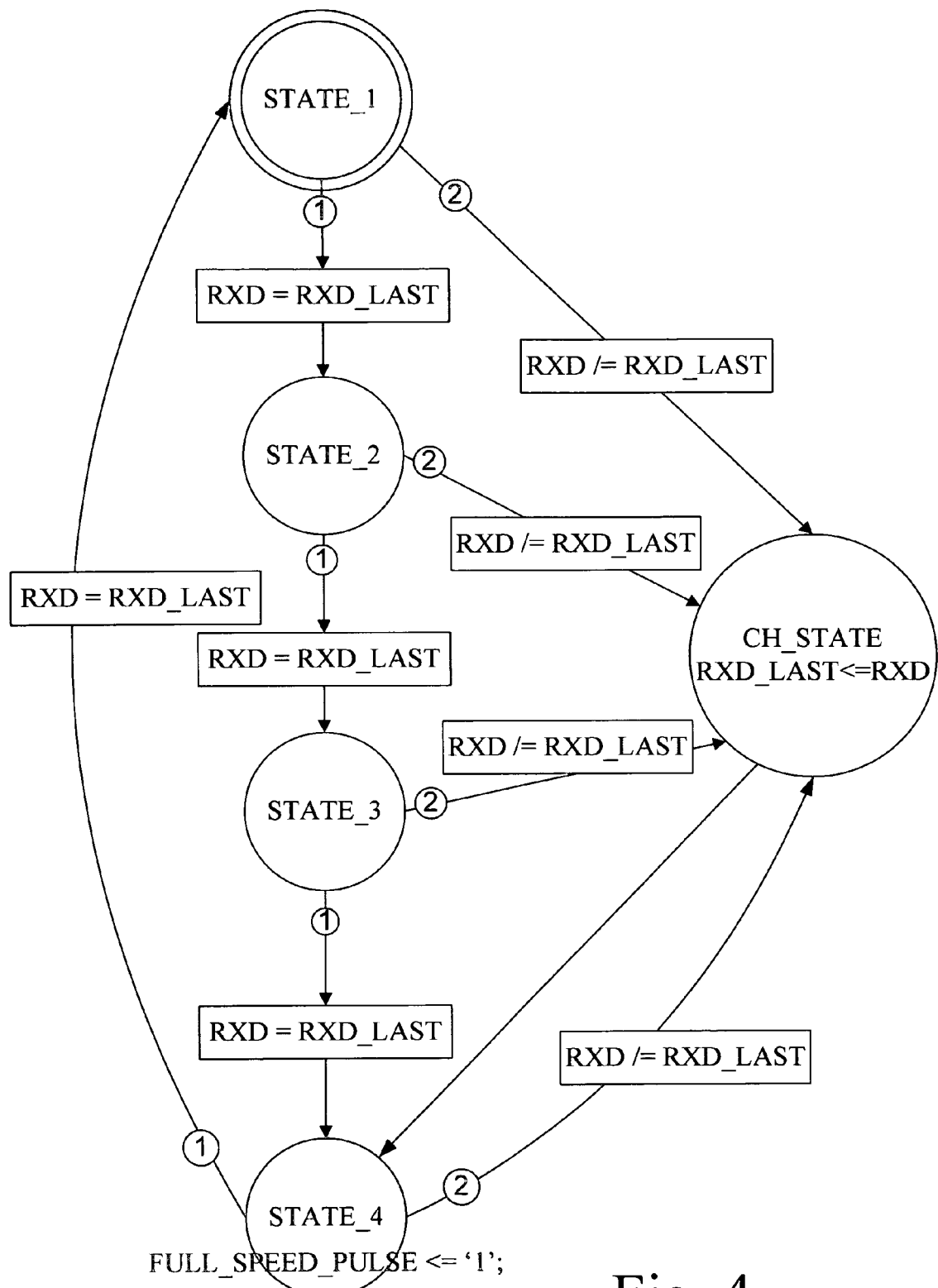
FIG. 4 is a state diagram describing the operation of the full-speed controller of FIG. 3.
Figure 5:
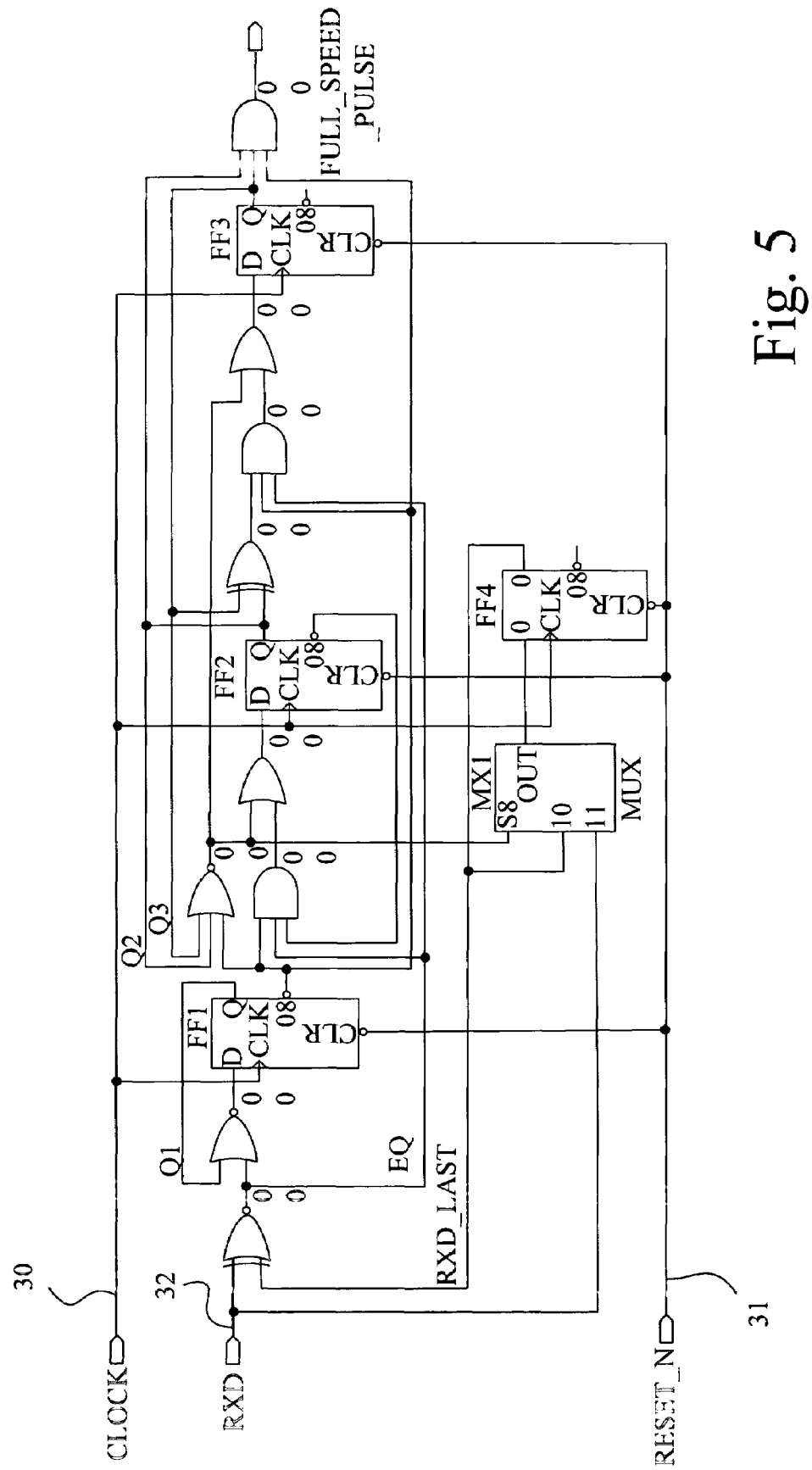
FIG. 5 is a schematic representation of the full-speed controller described by the state diagram of FIG. 4.

FIG. 4 is a state diagram describing the full-speed implementation of the full speed controller 56. FIG. 5 is a schematic representation of full-speed controller 56 that implements the state diagram of FIG. 4. The embodiment of FIGS. 4 and 5 uses a state machine to implicitly implement a counter, and therefore, in this embodiment counter 59 shown in FIG. 2 is not used. The following state table represents the states labeled in the state diagram of FIG. 4. Thereafter, next-state equations are shown that are directly applicable to the state table and the schematic representation of full-speed controller 56 shown in FIG. 5.

TABLE 1

State Table For Generation of Full-Speed Signal
FULL_SPEED_PULSE as Synchronous Pulse SPG_PULSE

|  | Q1 | Q2 | Q3 | Cnt |
|---|---|---|---|---|
| STATE_1 | 0 | 0 | 0 | 2 |
| STATE_2 | 0 | 1 | 0 | 3 |
| STATE_3 | 0 | 0 | 1 | 0 |
| STATE_4 | 0 | 1 | 1 | 1 |
| CH_STATE | 1 | 0 | 0 | 0 |

Note: The counter value corresponding to each state is given as Cnt in the above State Table.

With reference to FIG. 5, the next state equations for full-speed generation of the synchronous pulse SPG_PULSE by full-speed controller 56 is as follows. Variables Q1, Q2 and Q3 are the output signals of flip-flops FF1, FF2 and FF3, respectively.

$$Q1_{n+1} = \overline{EQ + Q1_n}$$

$$Q2_{n+1} = \overline{Q1_n} \cdot \overline{Q2_n} \cdot EQ + Q1_n \cdot \overline{Q2_n}$$

$$Q3_{n+1} = \overline{Q1_n} \cdot \overline{Q2_n} \cdot Q3_n \cdot EQ + \overline{Q1_n}$$

The next state equation for the full-speed output FULL_SPEED_PULSE, as synchronous pulse SPG_PULSE, generated by full-speed controller 56 is as follows:

$$SPG = \overline{Q1_n} \cdot Q2_n \cdot Q3_n$$

Referring to FIG. 5, multiplexer MX1 controls when difference signal RXD is transferred into flip-flop FF4, which drives the signal RXD_LAST. The equation that controls the selection process for multiplexer MX1 is as follows:

$$S0 = Q1_n \cdot \overline{Q2_n} \cdot \overline{Q3_n}$$

Therefore, RXD_LAST will only be updated in the state CH_STATE of Table 1 above.

For full-speed USB, the preferred implementation uses a clock multiple of 4, i.e., clock signal CLK is four times the bit rate of the USB data. In that case, there are four possibilities when serial interface engine 16 receives a USB sync pattern (seven logic 0's followed by a logic 1) at the beginning of a USB data packet. After each change in difference signal RXD, the sampling is moved to sample in the middle of a data pulse. The first case, which is not shown, is that the synchronous pulse SPG_PULSE is already aligned with the incoming USB data packet. For all other cases, the synchronous pulse SPG_PULSE must be adjusted to be in synchronization with the incoming USB packet.

Figure 6:
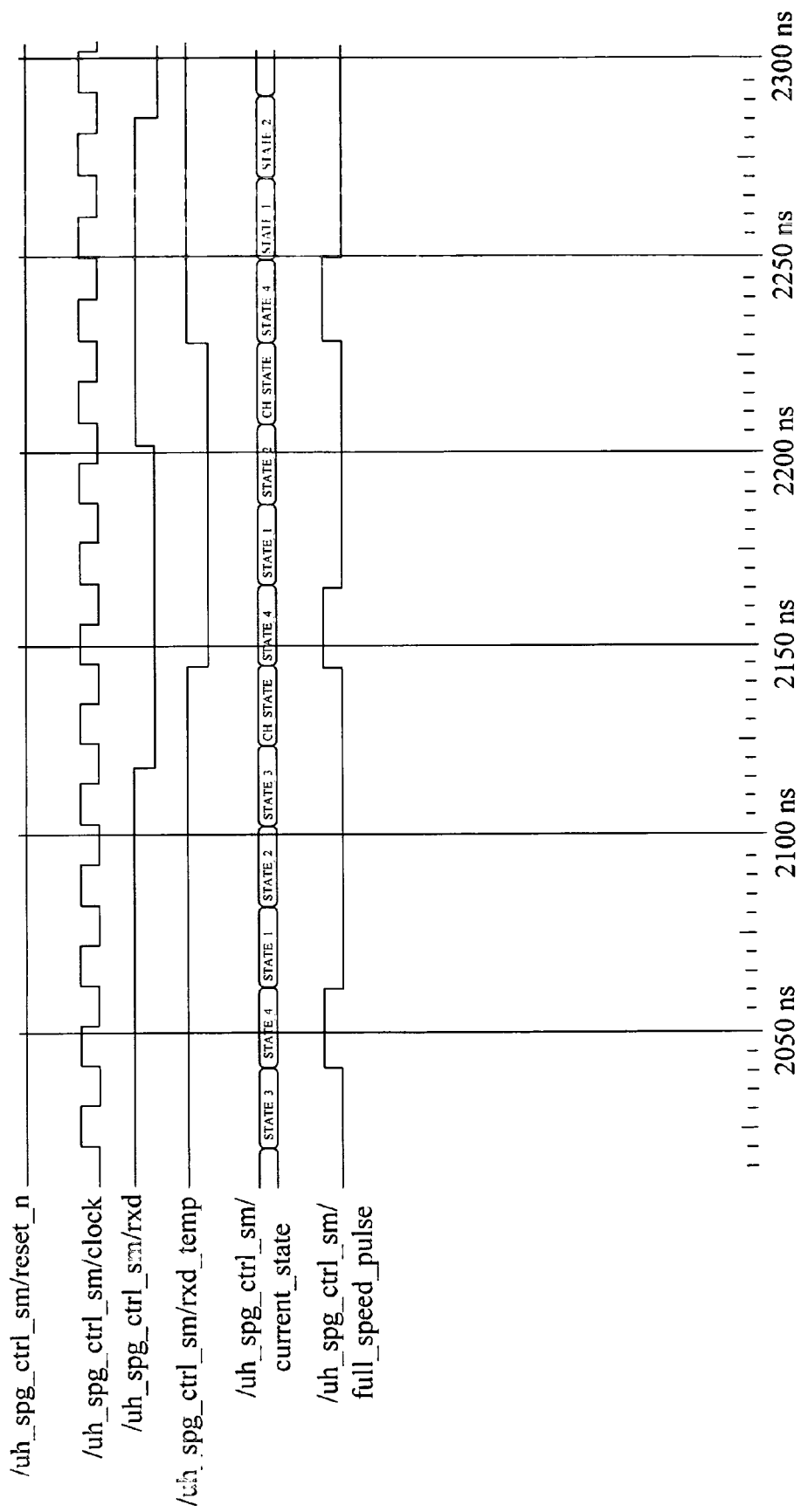
FIGS. 6, 7 and 8 show waveforms of signals associated with the full speed controller of FIG. 5.
Figure 7:
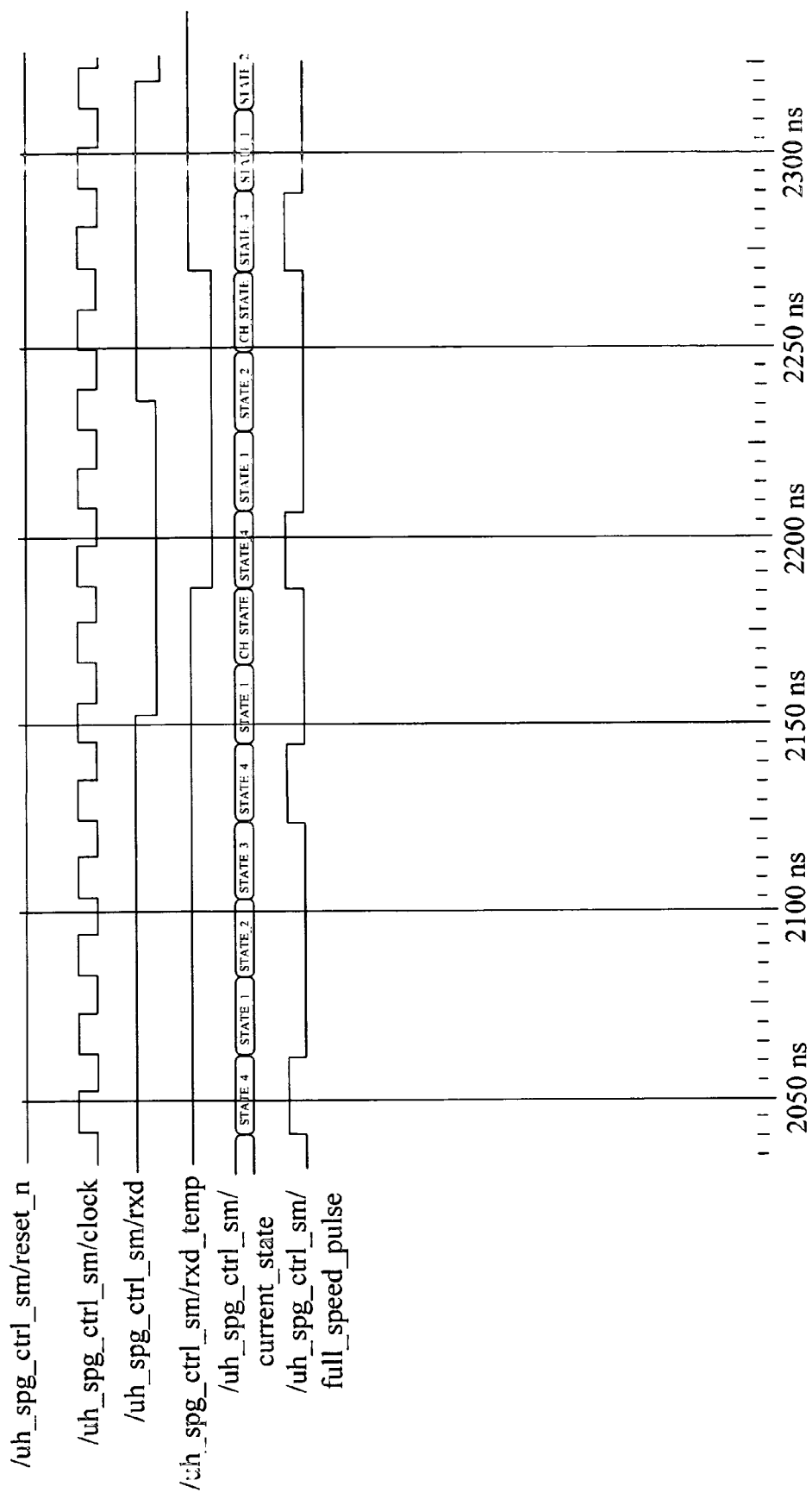
Figure 8:
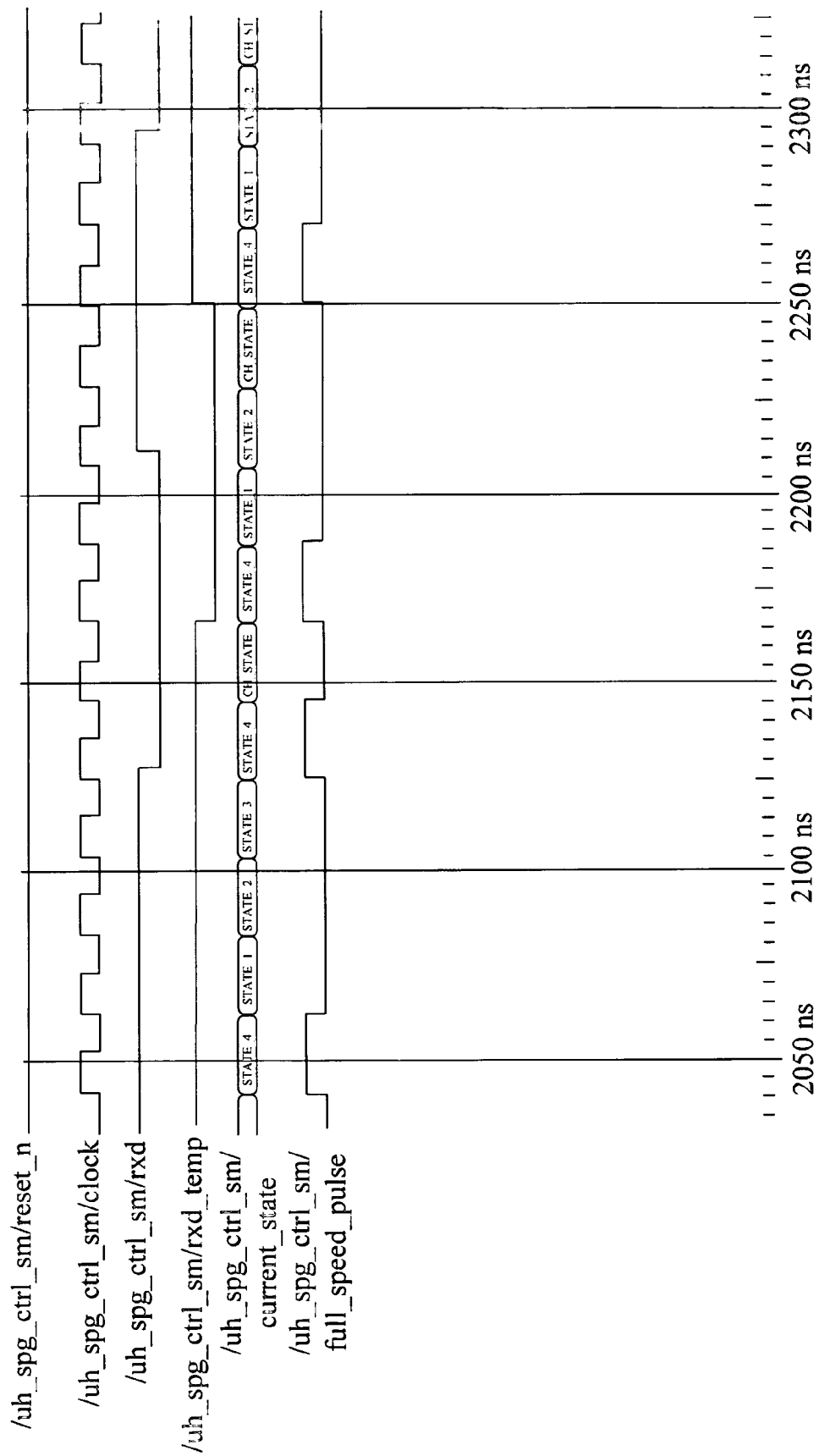

FIGS. 6, 7 and 8 show waveforms depicting the positioning of the sampling pulse FULL_SPEED_PULSE in relation to clock signal CLK, difference signal RXD and stored prior difference signal RXD_TEMP. The waveform diagram in FIG. 6 shows the output pulse FULL_SPEED_PULSE being delayed by one clock cycle. The waveform diagram in FIG. 7 shows the output pulse FULL_SPEED_PULSE being pulled in by one clock cycle. The waveform diagram in FIG. 8 shows the output pulse FULL_SPEED_PULSE being pulled in by two clock cycles. Each of the conditions is addressed by the implementation of full speed controller 56 of synchronous pulse generator 14.

Figure 9:
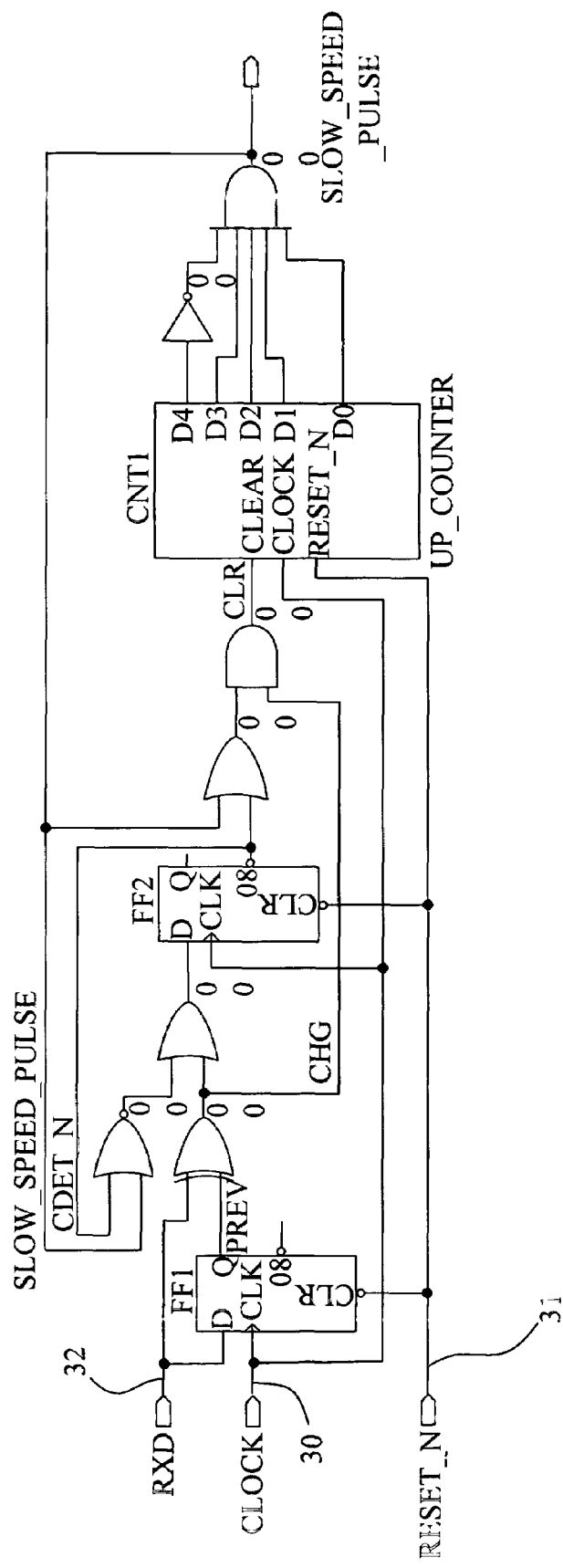
FIG. 9 is a schematic representation of the slow-speed controller of FIG. 3.

FIG. 9 is a schematic representation of slow-speed controller 58. Preferably, slow-speed controller 58 is implemented using a 5-bit binary up-counter CNT1 because a state-machine implementation would require approximately 48 states. The following logic equations are directly applicable to the schematic of FIG. 9 for generation of slow speed synchronous pulse SLOW_SPEED_PULSE by slow-speed controller 58 (see FIG. 2):

$Q1_{n+1} = RXD$ $PREV = Q1_{n+1}$ $CHG = PREV \oplus RXD$ $\overline{Q2_{n+1}} = CHG + \overline{CDET} \cdot \overline{SLOW\_SPEED\_PULSE}$ $CDET\_N = \overline{Q2_{n+1}}$ $CLR = CHG \cdot (CDET + SLOW\_SPEED\_PULSE)$ Referring to the equations immediately set forth above, the signal PREV (also referred to herein as RXD_TEMP) is the stored value of difference signal RXD. The signal CHG represents a value change in difference signal RXD and is asserted when the PREV value of difference signal RXD does not match its current value. The signal CDET_N is the inverted value of the signal that signifies that a change in difference signal RXD has been detected and is used to debounce difference signal RXD. If difference signal RXD changing causes the signal CLR to be asserted, the signal CLR will only be asserted once until the slow speed synchronous pulse SLOW_SPEED_PULSE has been generated. CLR will also be asserted if a change is occurring during the assertion of the slow speed synchronous pulse SLOW_SPEED_PULSE. Slow speed synchronous pulse SLOW_SPEED_PULSE. corresponding to synchronous pulse SPG_PULSE in the slow speed implementation, will be asserted when the count of counter CNT1 has reached 15.

Figure 10:
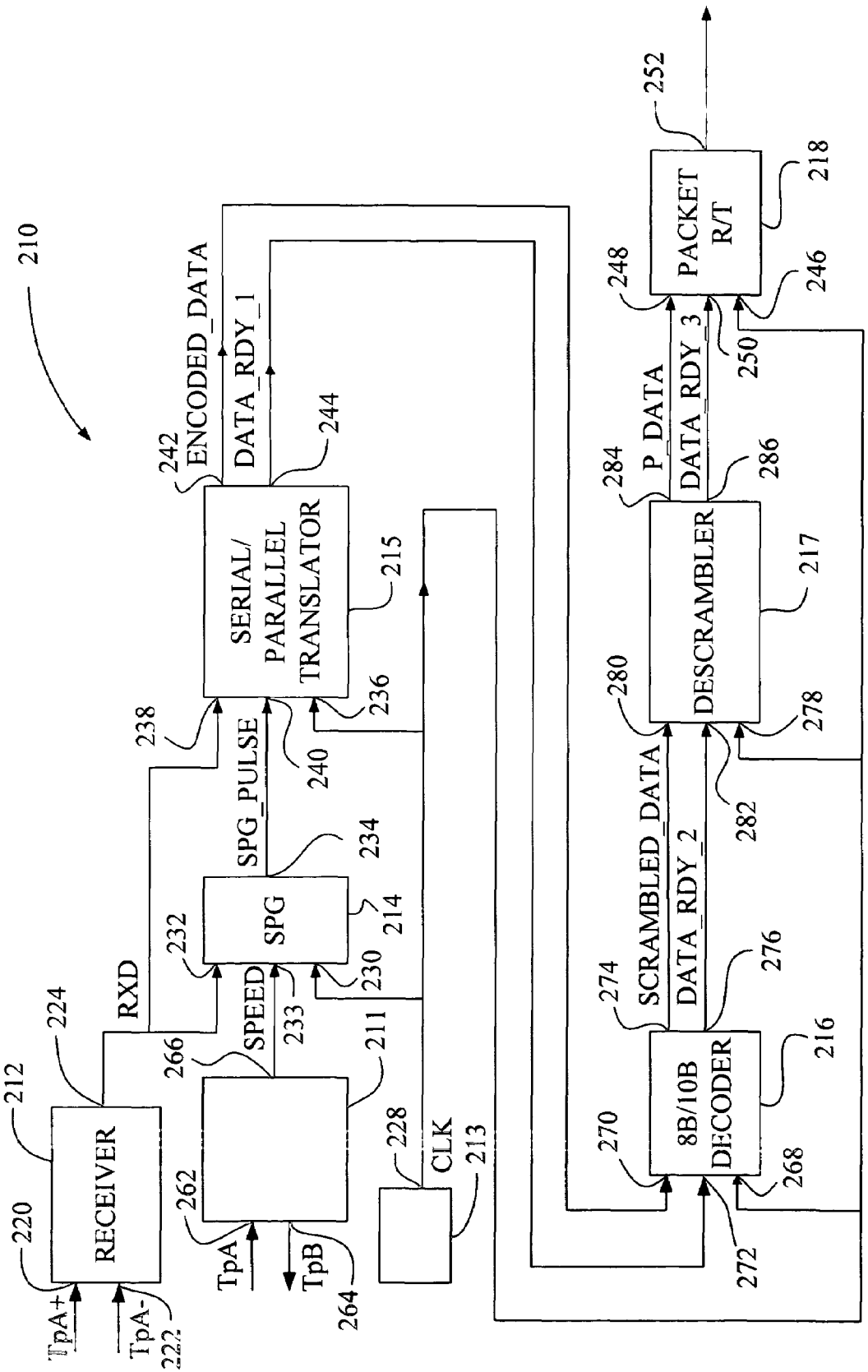
FIG. 10 is a general block diagram of an IEEE-1394b communications device embodying the present invention.

Referring now to FIG. 10, there is shown a general block diagram of an IEEE-1394b communications device 210 illustrating another embodiment of the present invention.

Those skilled in the art will recognize that the transmitter portion of an IEEE-1394b communications device pertaining to the generation and transmission of data packets using a IEEE-1394b protocol can be implemented using apparatus and methods well known in the art. Thus, for ease of understanding the present invention, the transmitter portion of IEEE-1394b communications device pertaining to the generation and transmission of data using an IEEE-1394b protocol is omitted from further discussion herein.

The present invention synchronizes IEEE-1394b communications device 210 with incoming IEEE-1394b data. IEEE-1394b communications device 210 is preferably implemented in the form of an application specific integrated circuit (ASIC), and includes processing circuitry for processing signals in a predetermined fashion. As shown in the block diagram of FIG. 10, IEEE-1394b communications device 210 includes a connection manager 211, a receiver 212, a clock source 213, a synchronous pulse generator (SPG) 214, a serial/parallel translator 215, an 8B/10B decoder 216, a descrambler 217 and a packet receiver/transmitter (Packet R/T) 218.

Connection manager 211 has an input 262, output 264 and bus speed output 266. Input 262 is adapted for receiving toning signals on TpA. As used herein, "toning signals" are signals which contain speed information and are used to negotiate a communication speed with a host or peripheral device. Output 264 is adapted for sending toning signals on TpB, and bus speed output 266 is adapted to provide a value SPEED. Connection manager 211 processes toning signals received on input 262 from a host or peripheral device (not shown) and sends toning signals on output 264 to the host or peripheral device to establish a communication speed. Once connection manager 211, in conjunction with the sending device has arrived at the operating speed of the bus, the value SPEED is output on bus speed output 266.

Receiver 212 has a first input 220, a second input 222 and a difference signal output 224. First input 220 is adapted for receiving a first data signal stream TpA+ and second input 222 is adapted for receiving a second data stream TpA−. First data signal stream TpA+ and second data signal stream TpA− are two data signal lines of the IEEE-1394b bus. Receiver 212 executes processing steps for processing first data signal stream TpA+ and second data signal stream TpA− to generate a difference signal RXD representing a voltage difference between first data signal stream TpA+ and second data signal stream TpA−. Difference signal RXD is output on difference signal output 224.

Clock source 213 is a free running oscillator having a clock output 228. Clock source 213 generates a clock signal CLK that is provided to clock output 228. Preferably, clock signal CLK has a frequency of 4 times the operational speed of the IEEE-1394b device, although it is to be understood that the present invention will work with any clock frequency that is a multiple of 4 or more times the speed of the IEEE-1394b bus from which data is to be extracted.

Synchronous pulse generator 214 has a clock input 230, a difference signal input 232, a speed input 233 and a synchronous pulse output 234. Clock input 230 is coupled to clock output 228 of clock source 213 and is adapted for receiving clock signal CLK. Difference signal input 232 is coupled to difference signal output 224 of receiver 212 for receiving difference signal RXD. Speed input 233 is coupled to bus speed output 266 of connection manager 211 for receiving bus speed value SPEED. The value of SPEED informs synchronous pulse generator 214 of the speed at which difference signal RXD will be received. Synchronous pulse generator 214 utilizes bus speed signal SPEED and executes processing steps to process clock signal CLK and difference signal RXD to generate a synchronous pulse SPG_PULSE that in turn is provided to synchronous pulse output 234. Synchronous pulse SPG_PULSE is used to signify a time for sampling difference signal RXD to extract data from difference signal RXD.

Serial/parallel translator 215 has clock input 236, a difference signal input 238, a synchronous pulse input 240, an encoded data output 242 and a first data ready output 244. Clock input 236 is coupled to clock output 228 of clock source 213, for receiving clock signal CLK. Difference signal input 238 is coupled to difference signal output 224 of receiver 212, and in parallel with difference signal input 232 of synchronous pulse generator 214, for receiving difference signal RXD. Synchronous pulse input 240 is coupled to synchronous pulse output 234 of synchronous pulse generator 214 for receiving synchronous pulse SPG_PULSE. Serial/parallel translator 215 executes processing steps to process clock signal CLK, difference signal RXD and synchronous pulse SPG_PULSE to generate a 10 bit parallel data word ENCODED_DATA. When ENCODED_DATA is present at encoded data output 242, serial/parallel translator 215 further generates a first data ready signal DATA_RDY_1 that is provided to first data ready output 244.

8B/10B decoder 216 has clock input 268, an encoded data input 270, a first data ready input 272, a scrambled data output 274 and a second data ready output 276. Clock input 268 is coupled to clock output 228 of clock source 213, for receiving clock signal CLK. Encoded data input 270 is coupled to encoded data output 242, for receiving the 10 bit wide encoded data word ENCODED_DATA. First data ready input 272 is coupled to first data ready output 244, for receiving signal DATA_RDY_1. 8B/10B decoder 216 executes processing steps to process clock signal CLK, encoded data word ENCODED_DATA and first data ready input signal DATA_RDY_1 to generate an 8 bit scrambled data word SCRAMBLED_DATA. When SCRAMBLED_DATA is present at scrambled data output 274, 8B/10B decoder 216 further generates a second data ready signal DATA_RDY_2 that is provided to second data ready output 276.

Descrambler 217 has clock input 278, a scrambled data input 280, a second data ready input 282, a parallel data output 284 and a third data ready output 286. Clock input 278 is coupled to clock output 228 of clock source 213, for receiving clock signal CLK. Scrambled data input 280 is coupled to scrambled data output 274, for receiving the scrambled data word SCRAMBLED_DATA. Second data ready input 282 is coupled to second data ready output 276, for receiving signal DATA_RDY_2. Descrambler 217 executes processing steps to process clock signal CLK, scrambled data word SCRAMBLED_DATA and second data ready input signal DATA_RDY_2 to generate a parallel data word P_DATA. When P_DATA is present at parallel data output 284, descrambler 217 further generates a third data ready signal DATA_RDY_3 that is provided to third data ready output 286.

Packet receiver/transmitter 218 has a clock input 246, a parallel input 248, a third data ready input 250, and an output 252. Clock input 246 is coupled to clock output 228 of clock source 213, for receiving clock signal CLK. Parallel input 248 is coupled to parallel data output 284 of descrambler 217, for receiving parallel data P_DATA. Third data ready input 250 is coupled to third data ready output 286 of descrambler 217 for receiving third data ready signal DATA_RDY_3. Packet receiver/transmitter 218 executes processing steps to process clock signal CLK, parallel data P_DATA and third data ready signal DATA_RDY_3 to generate processed data for output on output 252. Output 252 is coupled to an IEEE-1394b link-layer controller (not shown) through a PHY-link interface (not shown).

During operation of IEEE-1394b communications device 210, the physical IEEE-1394b signals, including data signal stream TpA+ and data signal stream TpA−, initially enter receiver 212. Receiver 212 generates difference signal RXD which is based on the condition of the voltage difference between TpA+ and TpA−. The IEEE-1394b specification defines the level of the voltage difference between TpA+ and TpA− which result a logic 1 or a logic 0 being assigned to difference signal RXD. Difference signal RXD is passed to both synchronous pulse generator 214 and serial/parallel translator 215. The synchronization pulse SPG_PULSE generated by synchronous pulse generator 214 is used to synchronize the logic in serial/parallel translator 215 for extraction of data from difference signal RXD, and the generation of 10 bit word ENCODED_DATA. The 10 bit word ENCODED_DATA is provided to 8B/10B decoder 216 which decodes ENCODED_DATA from the 8B/10B encoding into an 8 bit data word SCRAMBLED_DATA. SCRAMBLED_DATA is provided to descrambler 217 which uses SCRAMBLED_DATA to generate the recovered parallel data P_DATA which is transferred to packet receiver/transmitter 218. Packet receiver/transmitter 218 is responsible for transferring the P_DATA to a PHY-Link interface in an IEEE-1394b communication device.

It should be understood that the data stream represented by the electrical difference in a twisted pair cable in the foregoing description may also refer to a data stream from some other source, such as a fiber-optic link.

In order to read received IEEE-1394b data it is necessary to synchronize synchronization pulse SPG_PULSE with the rate at which the data is changing. Optimally, data must be captured near the center of the bit period. This is accomplished by aligning synchronization pulse SPG_PULSE a certain number of clock periods after a change in the difference signal RXD. Every time a synchronization pulse SPG_PULSE is generated, serial/parallel translator 215 samples difference signal RXD to determine what bit value is being transferred. In order to correctly receive the data that is sent, synchronization pulse SPG_PULSE must be aligned correctly with difference signal RXD. IEEE-1394b uses 8B/10B encoding to guarantee a maximum run length of 5 unchanged bits without a transition on difference signal RXD, thus enabling the receiving device to be synchronized with the IEEE-1394b transmitter of the transmitting device.

Figure 11:
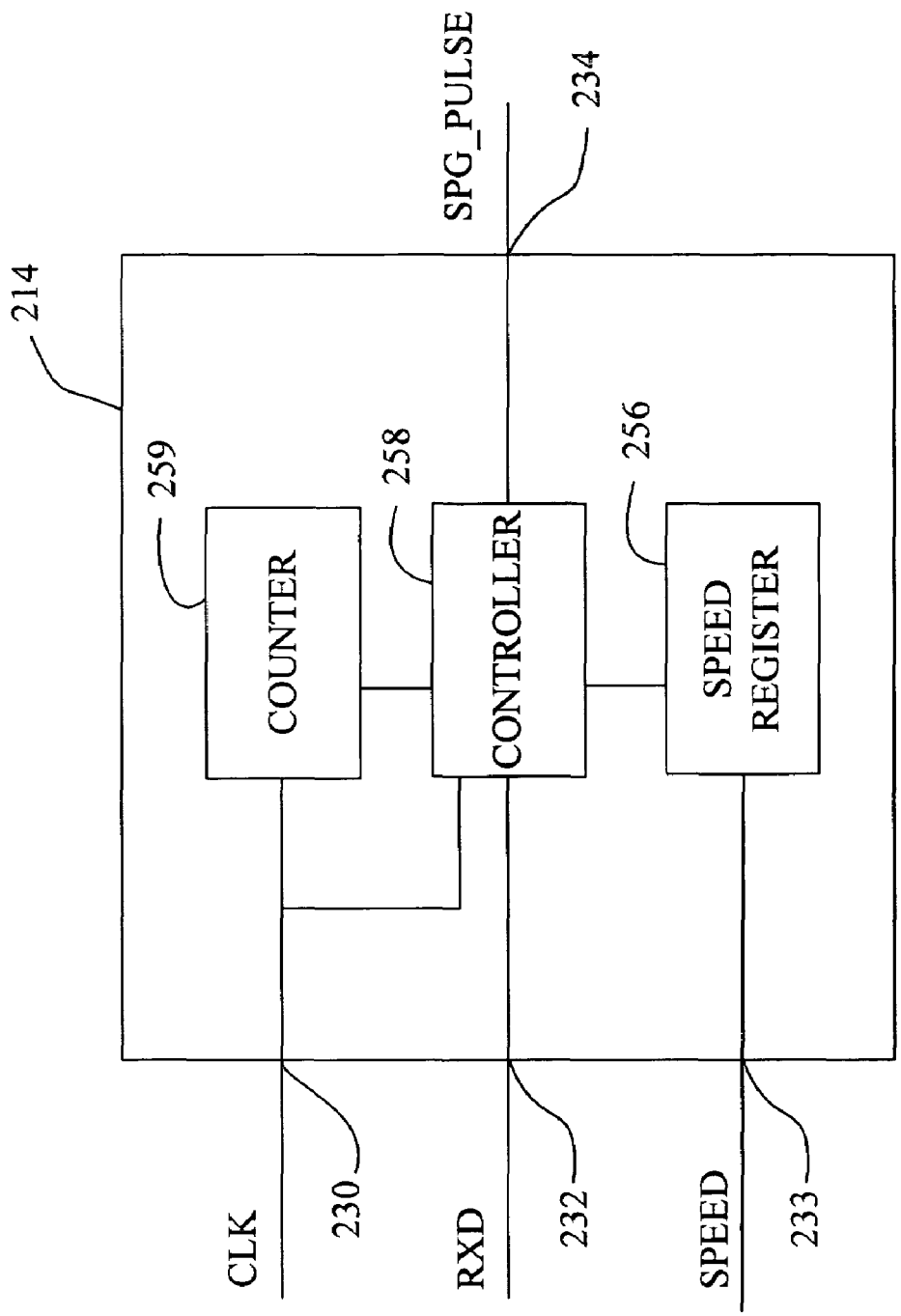
FIG. 11 is a general block diagram of a synchronous pulse generator embodying the present invention.

FIG. 11 is a detailed block diagram of synchronous pulse generator 214. As previously described, synchronous pulse generator 214 has clock input 230, difference signal input 232, speed input 233 and synchronous pulse output 234. Synchronous pulse generator 214 includes a speed register 256, a controller 258 and a counter 259. Counter 259 provides count values to controller 258 and counter 259 increments at each cycle of clock signal CLK. Counter 259 may be implemented as a physical counter device, or in software or firmware as a state machine. Speed register 256 receives IEEE-1394b bus speed information from connection manager 211 and provides bus speed information to controller 258 to be utilized in determining when a synchronous pulse should be generated.

The process depicted in FIG. 3 as previously described with respect to the embodiment of FIGS. 1 and 2 is carried out in substantially the same manner for the present embodiment of the invention described with reference to FIGS. 10 and 11. Thus, the operation of synchronous pulse generator 214 is substantially the same as that of synchronous pulse generator 14, with the primary difference being that synchronous pulse generator 214 includes speed register 256 and controller 258 for accommodating more than two operating speeds. Referring to that previous description herein, it should be noted that the speed of the IEEE-1394b bus includes frequencies of 98.304 MHz, 196.608 MHz, 393.216 MHz, 786.432 MHz, 1.572864 GHz and 3.145728 GHz. Therefore, as an example, if clock signal CLK has a frequency of 12.582912 GHz, and the IEEE-1394b bus has a frequency of 393.216 MHz the value of clock multiple M is 32. Then, K, which is the maximum value of counter 259 used in synchronous pulse generator 214, will have a value of 31 in this example. S, which is the value of counter 259 at which time difference signal RXD is to be sampled, will have the value of 15 in this example.

An implementation of controller 258 as a state machine can be understood to operate in a substantially identical fashion as the state machine depicted in FIG. 4 and the previous discussion of a state machine. For the sake of convenience, substituting the nomenclature "SPG_PULSE", as used in this embodiment of the invention, for the term "FULL_SPEED_PULSE" used in FIG. 4 and the previous discussion, serves to describe a state machine for the implementation of controller 258. It should be noted that the implementation of controller 258 as depicted in FIG. 4 is illustrative of only the specific implementation of when clock multiple M is equal to 4. Those skilled in the art will recognize that the present invention may be easily adapted to accommodate clock multiples other than 4.

For the sake of convenience, substituting the nomenclature "SPG_PULSE", as used in this embodiment of the invention, for the term "FULL_SPEED_PULSE" as used in FIGS. 6, 7 and 8 aid in the understanding of this invention. FIGS. 6, 7 and 8 show waveforms depicting the positioning of the sampling pulse SPG_PULSE in relation to clock signal CLK, difference signal RXD and stored prior difference signal RXD_TEMP, when clock multiple M is equal to 4. The waveform diagram in FIG. 6 shows the output pulse SPG_PULSE being delayed by one clock cycle. The waveform diagram in FIG. 7 shows the output pulse SPG_PULSE being pulled in by one clock cycle. The waveform diagram in FIG. 8 shows the output pulse SPG_PULSE being pulled in by two clock cycles. Each of these conditions are addressed by the implementation of controller 258 of synchronous pulse generator 214.

The substitution of nomenclature as suggested in the prior two paragraphs is to aid in the understanding the invention. It should be understood that figures similar to FIGS. 4, 6, 7 and 8 will result for clock multiples other than 4.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for effecting synchronous pulse generation for use in variable speed serial communications, comprising the steps of:

obtaining a communication link speed;
generating a difference signal representing a signal level difference between at least two data stream signals;
providing a clock signal;
providing a counter;
calculating a sample count value of said counter using said communication link speed;
incrementing said counter in relation to said clock signal;
determining whether a current count value of said counter corresponds to said sample count value, and
if said current count value corresponds to said sample count value then performing a step of generating a synchronous pulse, and
if said current count value does not correspond to said sample count value then performing a step of determining whether a signal level of said difference signal has changed, and if said signal level of said difference signal has changed then performing a step of ignoring further changes in said signal level of said difference signal until said current count value of said counter corresponds to said sample count value at which time said step of generating said synchronous pulse is repeated.

2. The method of claim 1, wherein said synchronous pulse is used to signify a time for performing a step of sampling said difference signal to extract data from said difference signal.

3. The method of claim 1, further comprising a step of defining a maximum count value of said counter, wherein if said current count value corresponds to said maximum count value then performing a step of resetting said counter.

4. The method of claim 1, wherein said step of ignoring further changes in said signal level of said difference signal further comprises the steps of:

resetting said counter;
determining whether said current count value corresponds to said sample count value; and
if said current count value does not correspond to said sample count value then performing a step of incrementing said counter each cycle of said clock signal until said current count value corresponds to said sample count value at which time a step of sampling said difference signal to extract data from said difference signal is performed.

5. The method of claim 1, wherein a communication link with which said communication link speed is associated is an IEEE-1394b bus.

6. The method of claim 1, wherein said communication link speed is a frequency of one of 98.304 MHz, 196.608 MHz, 393.216 MHz, 786.432 MHz, 1.572864 GHz and 3.145728 GHz.

7. The method of claim 1, further comprising the step of identifying said communication link speed from a plurality of possible communication link speeds.

8. The method of claim 7, wherein said plurality of possible communication link speeds is greater than two.

9. A method of extracting data from a difference signal representing a signal level difference between two data stream signals, comprising the steps of:

providing a clock signal;
determining a communication link speed;
providing a counter;
defining a sample count value of said counter utilizing said communication link speed;
incrementing said counter in relation to said clock signal;
determining whether a current count value of said counter corresponds to said sample count value, and if said current count value corresponds to said sample count value then performing a step of sampling said difference signal to extract data from said difference signal, and if said current count value does not correspond to said sample count value then performing a step of determining whether a signal level of said difference signal has changed, and if said signal level of said difference signal has changed then performing a step of ignoring further changes in said signal level of said difference signal until said current count value of said counter corresponds to said sample count value at which time said step of sampling said difference signal to extract data from said difference signal is repeated.

10. The method of claim 9, wherein when said current count value corresponds to said sample count value, said method further comprises the step of generating a synchronization pulse to signify a time for said sampling of said difference signal to extract data from said difference signal.

11. The method of claim 9, wherein a communication link with which said communication link speed is associated is an IEEE-1349b bus.

12. The method of claim 9, wherein said communication link speed is a frequency of one of 98.304 MHz, 196.608 MHz, 393.216 MHz, 786.432 MHz, 1.572864 GHz and 3.145728 GHz.

13. The method of claim 9, further comprising the step of identifying said communication link speed from a plurality of possible communication link speeds.

14. The method of claim 13, wherein said plurality of possible communication link speeds is greater than two.

15. The method of claim 9, further comprising a step of defining a maximum count value of said counter, wherein if said current count value corresponds to said maximum count value then performing a step of resetting said counter.

16. The method of claim 9, wherein said step of ignoring further changes in said signal level of said difference signal further comprises the steps of:

resetting said counter;

determining whether said current count value corresponds to said sample count value; and if said current count value does not correspond to said sample count value then performing a step of incrementing said counter each cycle of said clock signal until said current count value corresponds to said sample count value at which time said step of sampling said difference signal to extract data from said difference signal is repeated.

17. A method for effecting synchronous pulse generation for use in variable speed serial communications, comprising the steps of:

obtaining a communication link speed;

generating a difference signal representing a signal level difference between at least two data stream signals;

providing a clock signal;

providing a counter;

calculating a sample count value of said counter using said communication link speed;

incrementing said counter in relation to said clock signal;

determining whether a current count value of said counter corresponds to said sample count value, and if said current count value corresponds to said sample count value then performing a step of generating a synchronous pulse, and if said current count value does not correspond to said sample count value then performing a step of determining whether a signal level of said difference signal has changed. and if said signal level of said difference signal has changed then performing a step of ignoring further changes in said signal level of said difference signal until said current count value of said counter corresponds to said sample count value at which time said step of generating said synchronous pulse is repeated, wherein said step of determining whether said signal level of said difference signal has changed comprises the steps of:

checking said signal level of said difference signal each cycle of said clock signal;

storing said signal level of said difference signal at a first clock cycle as a temporary difference signal;

checking said signal level of said difference signal at a second clock cycle; and comparing said signal level of said temporary difference signal with said signal level of said difference signal at said second clock cycle.

18. A method of extracting data from a difference signal representing a signal level difference between two data stream signals, comprising the steps of:

providing a clock signal;

determining a communication link speed;

providing a counter;

defining a sample count value of said counter utilizing said communication link speed;

incrementing said counter in relation to said clock signal;

determining whether a current count value of said counter corresponds to said sample count value, and if said current count value corresponds to said sample count value then performing a step of sampling said difference signal to extract data from said difference signal, and if said current count value does not correspond to said sample count value then performing a step of determining whether a signal level of said difference signal has changed, and if said signal level of said difference signal has changed then performing a step of ignoring further changes in said signal level of said difference signal until said current count value of said counter corresponds to said sample count value at which time said step of sampling said difference signal to extract data from said difference signal is repeated, wherein said step of determining whether said signal level of said difference signal has changed comprises the steps of:

checking said signal level of said difference signal each cycle of said clock signal;

storing a first signal level of said difference signal at a first clock cycle as a temporary difference signal;

checking a second signal level of said difference signal at a second clock cycle; and comparing said first signal level of said temporary difference signal to said second signal level of said difference signal at said second clock cycle.

19. An IEEE 1394b communications device, comprising:

a receiver having a first input, a second input and a first output, said first input being adapted for receiving a first data signal stream and said second input being adapted for receiving a second data stream, wherein said receiver processes said first data signal stream and said second data signal stream to generate a difference signal representing a difference between said first data signal stream and said second data signal stream;

a synchronous pulse generator having a first clock input, a first difference signal input, a speed input and a synchronous pulse output, said first clock input being adapted for receiving a clock signal, said speed input being adapted to receive a communication speed and said first difference signal input being coupled to said output for receiving said difference signal, wherein said synchronous pulse generator processes said clock signal and said difference signal to generate a synchronous pulse used for extracting data from said difference signal;

a serial/parallel translator having a second clock input, a second difference signal input, a synchronous pulse input and an encoded data output, said second clock input being coupled to said first clock input for receiving said clock signal, said second difference signal input being connected to said first difference signal input for receiving said difference signal and said synchronous pulse input being connected to said synchronous pulse output for receiving said synchronous pulse, wherein said serial/parallel translator processes said clock signal, said difference signal and said synchronous pulse to generate encoded data for output on said encoded data output;

an 8B/10B decoder having a third clock input, an encoded data input and a scrambled data output, said third clock input being coupled to said first clock input for receiving said clock signal, said encoded data input being coupled to said encoded data output for receiving said encoded data, wherein said 8B/10B decoder processes said clock signal and said encoded data to generate scrambled data for output on said scrambled data output; and a descrambler having a fourth clock input, a scrambled data input and a parallel data output, said fourth clock input being coupled to said first clock input for receiving said clock signal, said scrambled data input being coupled to said scrambled data output for receiving said scrambled data, wherein said descrambler processes said clock signal and said scrambled data to generate parallel data for output on said parallel data output.

20. The IEEE-1394b communications device of claim 19, further comprising a connection manager having a toning input, a toning output and a bus speed output; said toning input being adapted for receiving toning signals; said toning output being adapted for sending toning signals; said bus speed output being coupled to said speed input for providing said communication speed, wherein said connection manager processes said toning signals received on said toning input and sends toning signals on said toning output to establish said communication speed, and wherein said connection manager provides said communication speed to said bus speed output.

21. The IEEE-1394b communications device of claim 19, wherein said synchronous pulse generator includes a speed register for storing a speed value which corresponds with said communication speed.

22. The IEEE-1394b communications device of claim 21, wherein said communication speed is one of a frequency of 98.304 MHz, 196.608 MHz, 393.216 MHz, 786.432 MHz, 1.572864 GHz and 3.145728 GHz.

* * * * *